US 8,539,087 B2

(12) United States Patent
Gawali et al.

(10) Patent No.: US 8,539,087 B2
(45) Date of Patent: Sep. 17, 2013

(54) SYSTEM AND METHOD TO DEFINE, VISUALIZE AND MANAGE A COMPOSITE SERVICE GROUP IN A HIGH-AVAILABILITY DISASTER RECOVERY ENVIRONMENT

(75) Inventors: Ashish Laxmanrao Gawali, Pune (IN); Arindam Mukherjee, West Bengal (IN); Amit Haridas Rangari, Maharashtra (IN); Kalyani Sundaralingam, Sunnyvale, CA (US); Sirisha Suryanarayan Kalpa, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 392 days.

(21) Appl. No.: 12/723,530

(22) Filed: Mar. 12, 2010

(65) Prior Publication Data
US 2011/0225095 A1  Sep. 15, 2011

(51) Int. Cl.
*G06F 15/16* (2006.01)
(52) U.S. Cl.
USPC .......................................................... 709/229
(58) Field of Classification Search
None
See application file for complete search history.

(56) References Cited

U.S. PATENT DOCUMENTS

| 6,178,529 | B1 | 1/2001 | Short et al. |
| 6,594,786 | B1 | 7/2003 | Connelly et al. |
| 6,857,082 | B1 | 2/2005 | Josan et al. |
| 2006/0047776 | A1 | 3/2006 | Chieng et al. |
| 2006/0059253 | A1* | 3/2006 | Goodman et al. ............. 709/223 |
| 2007/0083521 | A1* | 4/2007 | Diedrich et al. ................ 707/10 |

* cited by examiner

Primary Examiner — Yves Dalencourt
(74) Attorney, Agent, or Firm — Wilmer Cutler Pickering Hale and Dorr LLP

(57) ABSTRACT

A method for defining and managing a composite service group for a cluster based computer system is disclosed. The method includes instantiating a plurality of application units on a cluster based computer system, wherein the application units implement a business service. The method further includes receiving a composite service group definition, wherein a composite service group enumerates application units, out of the plurality of application units, that implement the business service, and generating a consolidated status of the composite service group. The business service is then started (online)/stopped (offline)/migrated/failed-over/failed-back in accordance with the consolidated status, as a single unit, by using the composite service group.

16 Claims, 12 Drawing Sheets

SYSTEM AND METHOD TO DEFINE, VISUALIZE AND MANAGE A COMPOSITE SERVICE GROUP IN A HIGH-AVAILABILITY DISASTER RECOVERY ENVIRONMENT

FIELD OF THE INVENTION

The present invention is generally related to digital computer systems, more particularly, to the management of multi-tier applications.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Companies have come to rely upon high-availability clusters to provide the most critical services and to store their most critical data. In general, there are different types of clusters, such as, for example, compute clusters, storage clusters, scalable clusters, and the like. High-availability clusters (also known as HA Clusters or Failover Clusters) are computer clusters that are implemented primarily for the purpose of providing high availability of services which the cluster provides. They operate by having redundant computers or nodes which are then used to provide service when system components fail.

Normally, if a server with a particular application crashes, the application will be unavailable until someone fixes the crashed server. HA clustering remedies this situation by detecting hardware/software faults, and immediately restarting the application on another system without requiring administrative intervention, a process known as Failover. As part of this process, clustering software may configure the node before starting the application on it. For example, appropriate file systems may need to be imported and mounted, network hardware may have to be configured, and some supporting applications may need to be running as well.

HA clusters are often used for critical databases, file sharing on a network, business applications, and customer services such as internet commerce websites. HA cluster implementations attempt to build redundancy into a cluster to eliminate single points of failure, including multiple network connections and data storage which is multiply connected via storage area networks or Internet protocol based storage.

Companies must minimize data loss and implement DR (disaster recovery) quickly in case disaster strikes. For example, a flood, hurricane, earthquake, or the like, can disrupt services and infrastructure across wide areas. Replication technology is primarily used for data distribution and DR. Periodic replication is one technique utilized to minimize data loss and improve the availability of data in which a point-in-time copy of data is replicated and stored at one or more remote sites or nodes. In the event of a site migration, failure of one or more physical disks storing data, or failure of a node or host data processing system associated with such a disk, the remote replicated data copy may be utilized.

Multi-tier applications representing a business service are often required to be managed as a single unit for HA/DR (high availability/disaster recovery). Generally, a multi-tier architecture refers to a client-server architecture in which the presentation, the application processing, and the data management are logically separate processes. For example, an application that uses middleware to service data requests between a user and a database employs a multi-tier architecture.

Multi-tier applications representing a business service need to be managed as a single unit for HA/DR. For example, various applications and processes that embody the functionality of the business service need to brought online or offline, switched over, failover or failed back as a single unit within or across different cluster sites.

SUMMARY OF THE INVENTION

Embodiments of the present invention facilitate convenient definition, visualization and management of multi-tier business services within and/or across clusters to provide for HA/DR (high-availability/disaster recovery) characteristics.

In one embodiment, the present invention is implemented as a method for defining and managing a composite service group for a cluster based computer system. The method includes instantiating a plurality of application units on a cluster based computer system, wherein the application units implement a business service. The method further includes receiving a composite service group definition, wherein a composite service group enumerates application units, out of the plurality of application units, that implement the business service, and generating a consolidated status of the composite service group. The business service is then brought online in accordance with the consolidated status by using the composite service group.

In one embodiment, the composite service group includes hierarchical dependency information controlling initialization for each of the application units that implement the business service.

In one embodiment, the composite service group includes sequential dependency information controlling initialization for each of the application units that implement the business service.

In one embodiment, the composite service group defines a boundary controlling communication between the applications that implement the business service and other applications units out of the plurality of application units.

In one embodiment, the composite service group encapsulates dependencies, constraints, or system placement strategies for the application units that implement the business service.

In one embodiment, the consolidated status visually indicates an individual status for each of the application units that implement the business service.

In one embodiment, the composite service group comprises a unit of failover between a first cluster and a second cluster, wherein the application units of the composite service group are failed over from the first cluster to the second cluster as a whole.

In one embodiment, the composite service group is used to set up a replication process between a primary site and a secondary site for high availability or disaster recovery.

In one embodiment, the composite service group is used to provide administrative control of the application units that implement the business service via a command line interface or a graphical user interface.

In one embodiment, at least one of the application units that implement the business service is a virtual machine application unit.

In one embodiment, the present invention is implemented as a computer readable storage medium having stored thereon, computer executable instructions that, if executed by a computer system cause the computer system to perform a method comprising instantiating a plurality of application units on a cluster based computer system, wherein the application units implement a business service. The method further includes receiving a composite service group definition, wherein a composite service group enumerates application units, out of the plurality of application units, that implement the business service, and generating a consolidated status of the composite service group. The method further includes bringing the business service online in accordance with the consolidated status by using the composite service group, wherein the composite service group is used to provide administrative control of the application units that implement the business service.

In another embodiment, the present invention is implemented as a computer system, comprising a computer system having a processor coupled to a computer readable storage media and executing computer readable code which causes the computer system to: execute a composite service group manager module; receive a composite service group definition, wherein a composite service group enumerates application units, out of a plurality of application units, that implement a business service, and wherein the plurality of application units are instantiated on a cluster based computer system; generating a consolidated status of the composite service group. The computer readable code further causes the computer system to: set up a replication process between a primary site and a secondary site by using the composite service group, and bring the business service online in accordance with the consolidated status.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
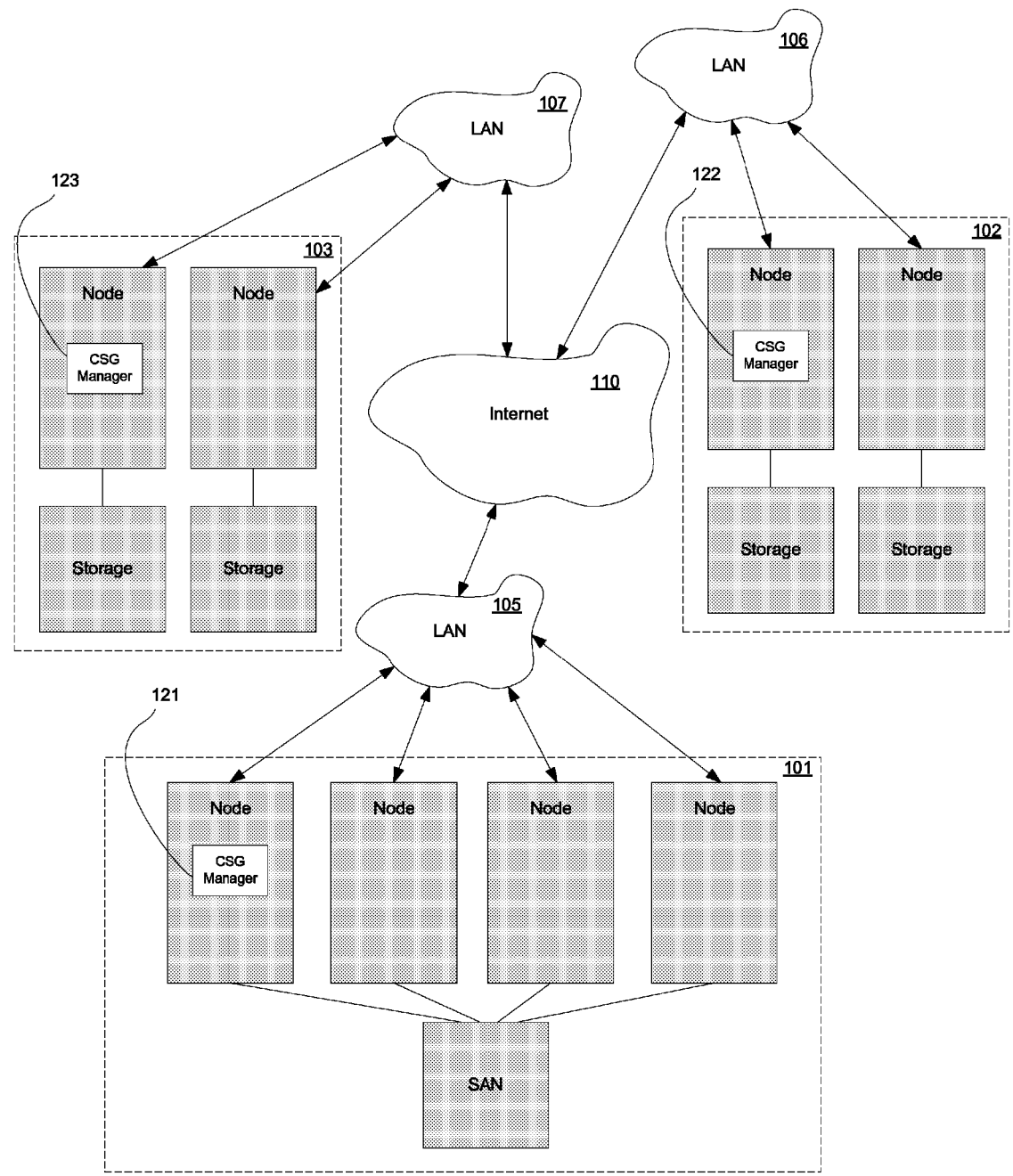
FIG. 1 shows a diagram depicting an HA/DR multi-cluster-based computing system in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention facilitate convenient definition, visualization and management of multi-tier business services within and/or across clusters to provide for HA/DR (high-availability/disaster recovery) characteristics. The systems and methods introduce a notion of a CSG (Composite Service Group) business service that is built upon HA/DR clustering software. In one embodiment, the present invention represents a container object in a cluster. The container object comprises all related applications. For example, the container object represents one or more business services or applications (e.g., running on physical or virtual machines), that can be defined, visualized and taken online, taken off-line, failed over, switched over, back within, or across cluster-sites as a single unit.

Figure 2:
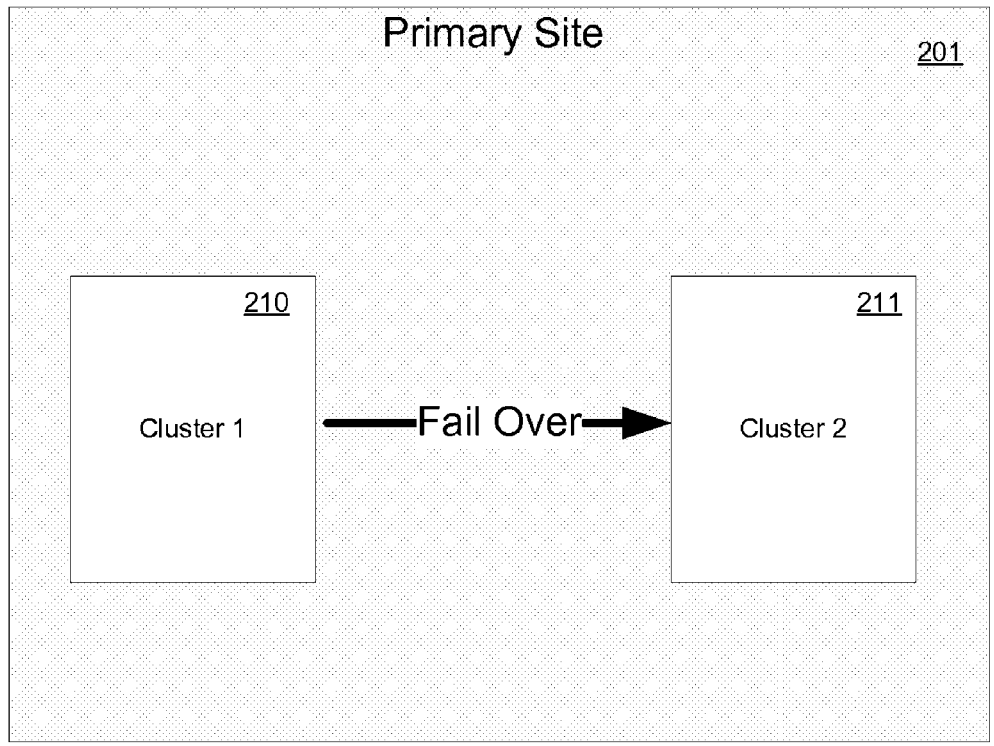
FIG. 2 shows an exemplary single site failover scenario for a cluster-based computer system environment in accordance with one embodiment of the present invention.
Figure 3:
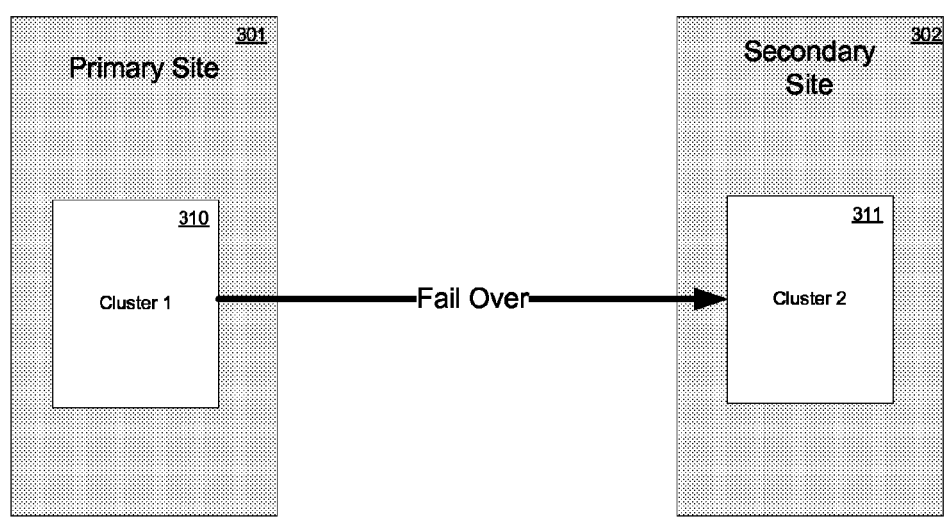
FIG. 3 shows an exemplary two site failover scenario for a cluster-based computer system environment in accordance with one embodiment of the present invention.
Figure 4:
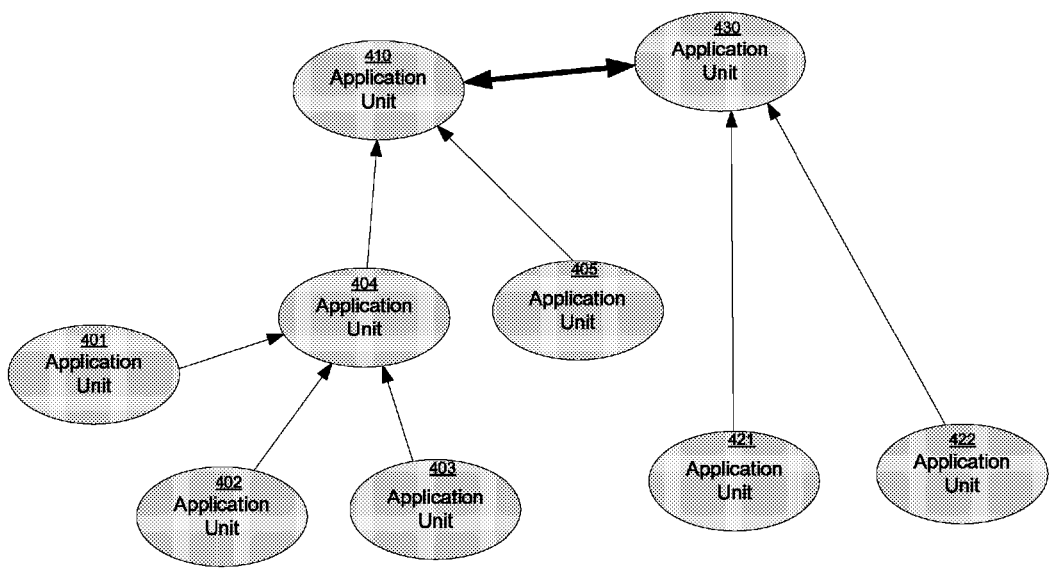
FIG. 4 shows a collection of application units that provide one or more business services in accordance with one embodiment of the present invention.

In one embodiment, consolidated status-visibility and automation for the business service (e.g., as in a multi-tier application) is facilitated. In one embodiment, a typical operating environment would encompass the automation of HA/DR replication process functions for a business service. A CSG in accordance with embodiments of the present invention provide a suitable container for applications encapsulating complex application dependencies, constraints and system placement strategies. FIG. 1 below discusses a typical cluster-based computer system environment. FIG. 2 and FIG. 3 show two example failover scenarios employed to provide HA/DR services in a cluster-based computer system environment. FIG. 4 shows an overview of CSG functionality characteristics.

Figure 10:
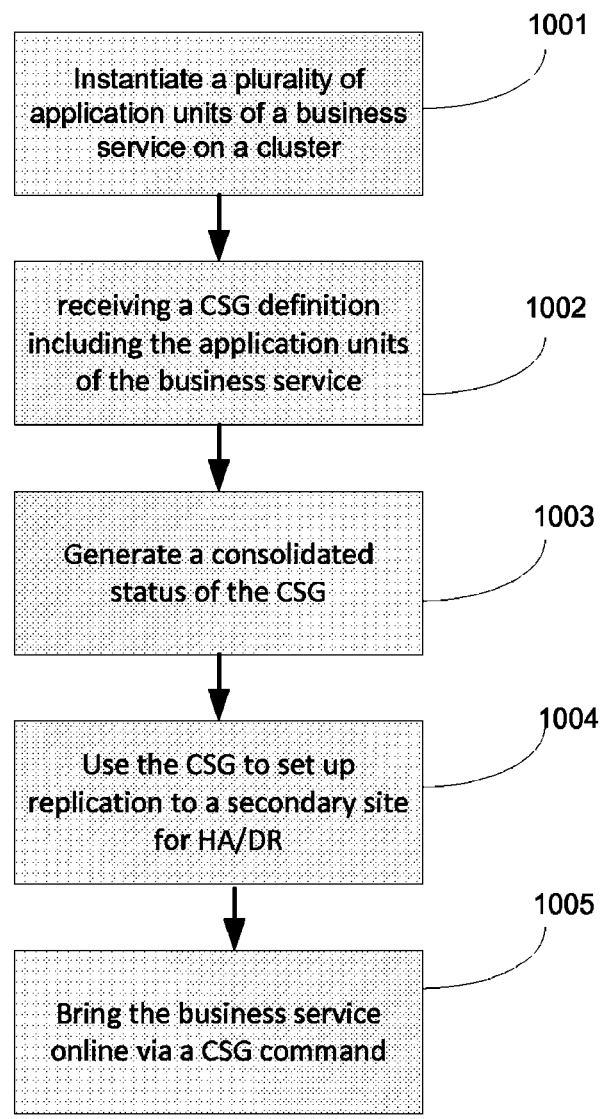
FIG. 10 shows a flowchart of the steps of a process for executing a business service on a cluster based computer system while providing HA/DR via a CSG in accordance with one embodiment of the present invention.

Referring now to FIG. 1, FIG. 1 shows a diagram depicting an HA/DR multi-cluster-based computing system in accordance with one embodiment of the present invention. As illustrated in FIG. 1, three clusters 101-103 are shown. The clusters 102-103 each comprise a two node cluster. Cluster 101 comprises a four node cluster. Each of the constituent nodes is shown connected to a respective storage device (e.g., disk drive, etc.), and the cluster 101 is shown connected to a SAN (storage area network). The nodes of each cluster communicate with one another via local area networks 105-107. These local area networks are in turn connected to the Internet 110. Although FIG. 1 shows clusters of two nodes and four nodes, it should be appreciated that embodiments of the present invention can readily scale and function in distributed computer systems and/or cloud based computer systems having hundreds or thousands of nodes. Similarly, it should be appreciated that although FIG. 1 shows physical nodes comprising the clusters, one or more nodes of FIG. 1 can be implemented as guest instances/applications instantiated on one or more virtual machines (e.g., as depicted in FIG. 10 below).

Thus, FIG. 1 shows the basic layout of a typical HA/DR multi-cluster computer system environment. As described above, a high availability cluster is a computer cluster that functions primarily by providing high availability of services to users and/or applications and assured disaster recovery. To provide in-cluster HA, the multiple redundant nodes of each cluster 101-103 are used to provide service in case one or more nodes of a cluster should fail (e.g., in-cluster failover). To provide cluster to cluster disaster recovery, the multiple clusters 101-103 can be implemented at geographically dispersed locations and employ periodic replication technology to provide assured disaster recovery. To recover from a failed cluster, entire groups of applications can failover from one cluster to another to minimize the interruption of application services and to minimize the risk of data loss.

FIG. 1 also shows the inclusion of a plurality of composite service group managers 121-123 in each of the clusters 101-103. The composite service group managers 121-123 implement the definition, visualization and management of multi-tier business services functionality of embodiments of the present invention. In the FIG. 1 embodiment, there exists at least one composite service group manager instantiated in each cluster, however, to provide redundancy, reliability, and the like, composite service group managers can be instantiated on each node of a given cluster.

FIG. 2 shows an exemplary single site failover scenario for a cluster-based computer system environment in accordance with one embodiment of the present invention. As depicted in FIG. 2, a primary site 201 incorporates two clusters 210 and 211.

In the FIG. 2 embodiment, the clusters 210-211 can be configured to provide HA/DR failover protection for one another. In this example, the clusters 210-211 are both at the primary site. However, the cluster 210 can be at one building on a campus while the cluster 211 is in another building on the campus. The physical separation in different buildings provides a degree of HA/DR, even though the two clusters are not widely geographically separated (e.g., hundreds of miles apart in different regions). Similarly, the two clusters can be on different floors within the same building, thus still providing a degree of HA/DR (e.g., where one cluster is in the basement while the other is on a different floor). Although within the same building, the physical separation of the clusters still provides a significant HA/DR protection (e.g., from fire extinguisher activation, unauthorized entry, etc.).

Although the clusters 210-211 are shown as two separate clusters, it should be noted that the clusters 210-211 can be implemented as two sub-clusters. In such an embodiment, a single larger cluster is partitioned into two sub-clusters which can each be provisioned to provide HA/DR protection for one another.

FIG. 3 shows an exemplary two site failover scenario for a cluster-based computer system environment in accordance with one embodiment of the present invention. As depicted in FIG. 3, a primary site 301 is communicatively connected to a secondary site 302. The primary and secondary sites 301-302 incorporate respective clusters 310-311.

In the FIG. 3 embodiment, the clusters 310-311 are configured to provide HA/DR failover protection for their respective sites. In this example, the clusters 310-311 are located at a geographically dispersed primary site and secondary site. The physical separation at widely geographically separated locations provides an exceptionally high degree of HA/DR protection. Their widely separated locations provide disaster recovery protection from large scale events that can affect services and disrupt infrastructure across large areas (e.g., hurricanes, earthquakes, tsunamis, etc.).

FIG. 4 shows a collection of application units that provide one or more business services in accordance with one embodiment of the present invention. As depicted in FIG. 4, the application units are shown with respect to their interdependencies with one another. FIG. 4 shows the manner in which application units on the lower portion of FIG. 4 provide constituent functionality and support for application units that are on the upper portion of FIG. 4. For example, the application units 401-403 each provide supporting functionality for the application unit 404. The application 404 and the application 405 provide supporting functionality for the top level application 410. Similarly, the application 421 and the application 422 provide supporting functionality for the top-level application 430. The arrow 450 represents the inter-process communication that occurs between the two top-level application units 410 and 430.

Thus, the application units 401-410 embody a multitier application, where each of the application units is required to implement constituent components of the overall functionality of a business service. This business service can be, for example, a purchase transaction processing business service of a web-based retail site. Similarly, the application units 421-430 comprise a second business service. This second business service is distinct and separate from the business service provided by the application units 421-430. In the FIG. 4 embodiment, communication between the two business services occurs only at high level application units 410 and 430.

It should be noted that as used herein, an application unit is an encompassing term that refers to a range of different processes or applications that implement the different components of functionality that make up an overall business service. The application unit can be an application executing on a physical machine (e.g., a database application, Web server, etc.). The application unit can be a virtual machine application unit, such as a guest instance on a virtual machine, or the entire virtual machine executing on a physical machine. The application unit can be on different platforms (e.g., MIPS, x86, Itanium, etc.). The application unit can be on different operating systems (e.g., Linux, Solaris, Windows, etc.). Each of the application units together implement a multitier architecture of the overall business service, where, for example, the application units are implemented as physically or logically separate processes/applications having generally standardized interfaces.

Figure 5:
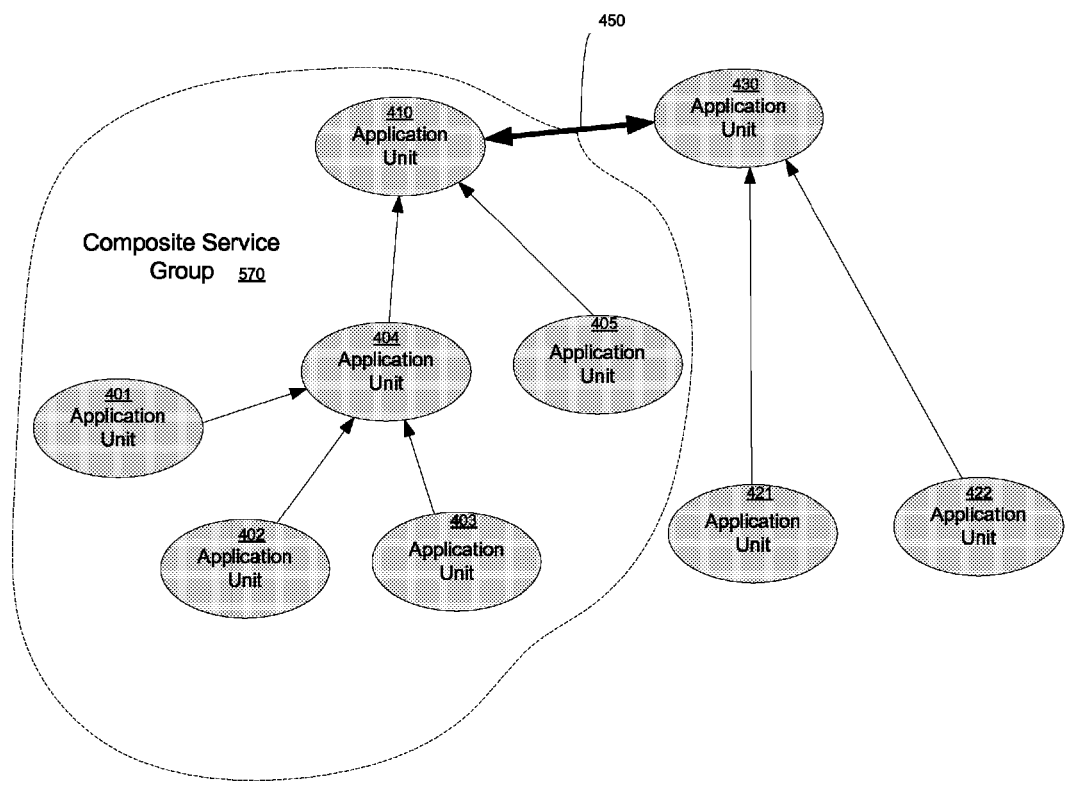
FIG. 5 shows the manner in which the application units are grouped into a composite service group in accordance with one embodiment of the present invention.

FIG. 5 shows the manner in which the application units are grouped into a composite service group 570 in accordance with one embodiment of the present invention.

FIG. 5 illustrates the manner in which embodiments of the present invention implement a CSG business service that represents a container object in a cluster. As described above, the container object (e.g., the CSG 570) comprises all related applications that provide functionality for the business service, in this case, the application units 401-410. The CSG 570 in accordance with embodiments of the present invention provides a suitable container for encapsulating complex application dependencies, constraints and system placement strategies.

For example, in an operating scenario where the CSG 570 implements a purchase transaction processing business service, the application units 401-410 the business service can be defined, visualized and taken online, taken off-line, failed over, switched over, back within, or across cluster-sites as a single unit. This single unit is the CSG 570. This single unit aspect of the CSG 570 greatly facilitates the automation of HA/DR process functions for the business service. Once the CSG 570 is defined, the replication and duplication of the application units comprising the CSG 570 can be readily automated, thereby ensuring a high degree of HA/DR protection.

In this manner, the CSG 570 comprises a unit of failover. Each of the application units comprising the CSG 570 may or may not be replicated and/or failed/failback over together as a whole.

Defining a CSG

Defining a CSG includes giving a unique name to an object (e.g., list data structure). In one embodiment, this object comprises an enumerated list that uniquely describes which application units make up a given business service. The unique name of the CSG enables the easy and recognizable manipulation and/or administration of the CSG by other processes or by a system administrator. A typical name could be, for example, the campus where the business services are provided (e.g., Stanford University, Mountain View, etc.) or the function the business service implements (e.g., book sales, children's clothing sales, etc.).

The enumerated list describes the hierarchical interrelationships that exist between the application units that make up the business service. The enumerated list describes any sequential dependencies that may exist. The hierarchical relationships captured by the enumerated list indicate which initializations of which application units can be executed in parallel and which initializations of which application units need to be executed sequentially. For example, the functionality of the application unit 404 depends upon the start up of the applications 401-404. Similarly, the functionality of the application unit 410 depends upon the initialization of the application units 404-405. The initialization of application units 401-403 can occur in parallel, while the initialization of application 410 must wait for the initialization of application 405 and the eventual initialization of application 404.

Additionally, the boundary of the CSG across the communication line 450 indicates that communication between the top-level application units 410 and 430 is stopped until all of the supporting application units 401-405 have initialized, thereby enabling application unit 410 to completely initialize.

It should be noted that privileges may be associated with the process of defining a new CSG, altering an existing CSG, deleting an existing CSG, or the like. For example, an authorization process can be established that requires authorization in accordance with a designated privilege level. Such an authorization process is to ensure a system administrator has sufficient privileges to perform such actions.

Visualizing a CSG

A display can be implemented to indicate a consolidated status for the application units comprising a CSG. The consolidated status can be a list delivered via a command line interface. The consolidated status can be visually indicated by a GUI that can visually indicate an individual status of each of the application units comprising the CSG.

In one embodiment, the consolidated status can visually indicate certain states indicating the current availability of the application. In one embodiment, flags and/or visual indicators can indicate whether a CSG is offline, partial or online. A CSG is online only when all of its application units are fully available. A CSG is partial if at least one application unit of the CSG is not fully available. If it is completely unavailable, then at least one other application units exists, which is partly or completely available. A CSG is offline when all of its application units are completely unavailable.

Managing a CSG

In one embodiment, managing a CSG involves being able to start a CSG, stop a CSG, switch a CSG between different sites, and the like. This management is via reference to the CSG name. The management is implemented typically by a system administrator via either a command line interface or a GUI. As described above, the system administrator can be required to establish authorization (e.g., username and password) in accordance with a designated privilege level to perform such actions. Using the command line interface or the GUI, the system administrator can execute a single command referencing the CSG to bring the entire CSG online, take the entire CSG off-line, and the like.

Description of Exemplary CSG Features and Functions

The following is an outline of certain CSG features and functions in accordance with embodiments of the present invention.

A) A CSG is a first class object that provides containment for apps that constitutes business service as specified by a system administrator. So a typical CSG lifecycle includes:
  1) Define/create a first class CSG object consisting of list of application units as specified. These application units can have dependencies on other application units that may not be part of this CSG.
  2) Modify CSG object for:
  a) list of application units;
  b) list of clusters/sites that it can be failed/switched over/back to; and
  c) list of virtual machines.
  3) Delete the CSG object.
  4) Online/offline/switch the CSG object within/to required site/cluster.
  5) Clear the CSG fault on given cluster/site.
  6) Takeover the CSG on given cluster/site.
  7) Visualize the consolidated CSG state across sites/clusters.

B) Below are certain distinctive CSG characteristics:
  1) CSG is cross-platform & CSG object can span application tiers on different platforms.
  2) CSG is a cluster-wide global entity—it is not fled to or associated with specific systems in the cluster.
  3) Bring up multi-tier application (onlining a CSG) involves optimally placing parts of the application on different systems within the cluster obeying a set of constraints.

C) Since the related apps are grouped together in a CSG, consolidated status for the business service can be maintained & shown as described below:
  1) The CSG has only three fundamental states indicating the current availability of the application (offline, partial and online).
    a) A CSG is Online only when all of its application components are folly available.
    b) A CSG is Partial if at least one application component of the CSG is not fully available—it may be partly available but completely unavailable. If it is completely unavailable, then at least one other application component exists, which is partly or completely available.
    c) A CSG is Offline when all of its application components are completely unavailable.
  2) There are two modifiers (Flags) of the primary CSG states:
    a) Attention Flag—The unavailability of an application component within the CSG might be intentional and part of some set policy and schedule. But it can equally well be unintentional, and the result of a hard failure from which the underlying High Availability provider could not recover the application fully. For such, scenarios where the current or future availability of the multi-tier app may be compromised, we use an auxiliary State marker in the CSGs state—'Attention' flag. Thus a CSG in which all application components are faulted and down everywhere, will have a state of 'Offline|Attention'. On the other hand, a CSG all of whose app components are offline on purpose will have a state of 'offline'.
    b) Pending Flag—At certain points in time, one or more application components in the CSG might be transitioning from one state to another. To represent this, we use the 'Pending' flag. Thus a CSG that is online but has some application components transitioning to offline state will have a state of 'Online|Pending'.

Following are possible values for the consolidated CSG state:

ONLINE—All the application units in the CSG are online.

PARTIAL—Some application units in the CSG are offline and the others are in the online or the partial state. Or, no application units are offline, some or all application units are partial, and the rest, if any, are online.

OFFLINE—All the application units in the CSG are offline.

ONLINE|PENDING—All application units in the CSG are online, but one or more of the constituent application units are in transition to a different state.

PARTIAL|PENDING—Same as partial, but some application units are in transition to a different state.

PARTIAL|ATTENTION—Same as PARTIAL. but some application units are faulted or are unable to go online.

PARTIAL|ATTENTION|PENDING—Same as PARTIAL. but some application units are faulted or unable to go online, while one or more of the remaining application units in the CSG are in transition to a different state.

OFFLINE|PENDING—Same as OFFLINE, but some application units may be in transition to a different state.

OFFLINE|ATTENTION—One of the following conditions is true: All application units are faulted; all application units are offline or faulted: all application units are offline and some of them are unable to come online.

OFFLINE|ATTENTION|PENDING—Same as OFFLINE (ATTENTION but some application units in the CSG are in transition to a different state).

FIG. 6 through FIG. 9 each depict examples of different HA/DR replication statuses between a primary site and a secondary site of a composite service group in accordance with embodiments of the present invention. There could be more than two sites as well participating to provide HA/DR for composite service group.

Figure 6:
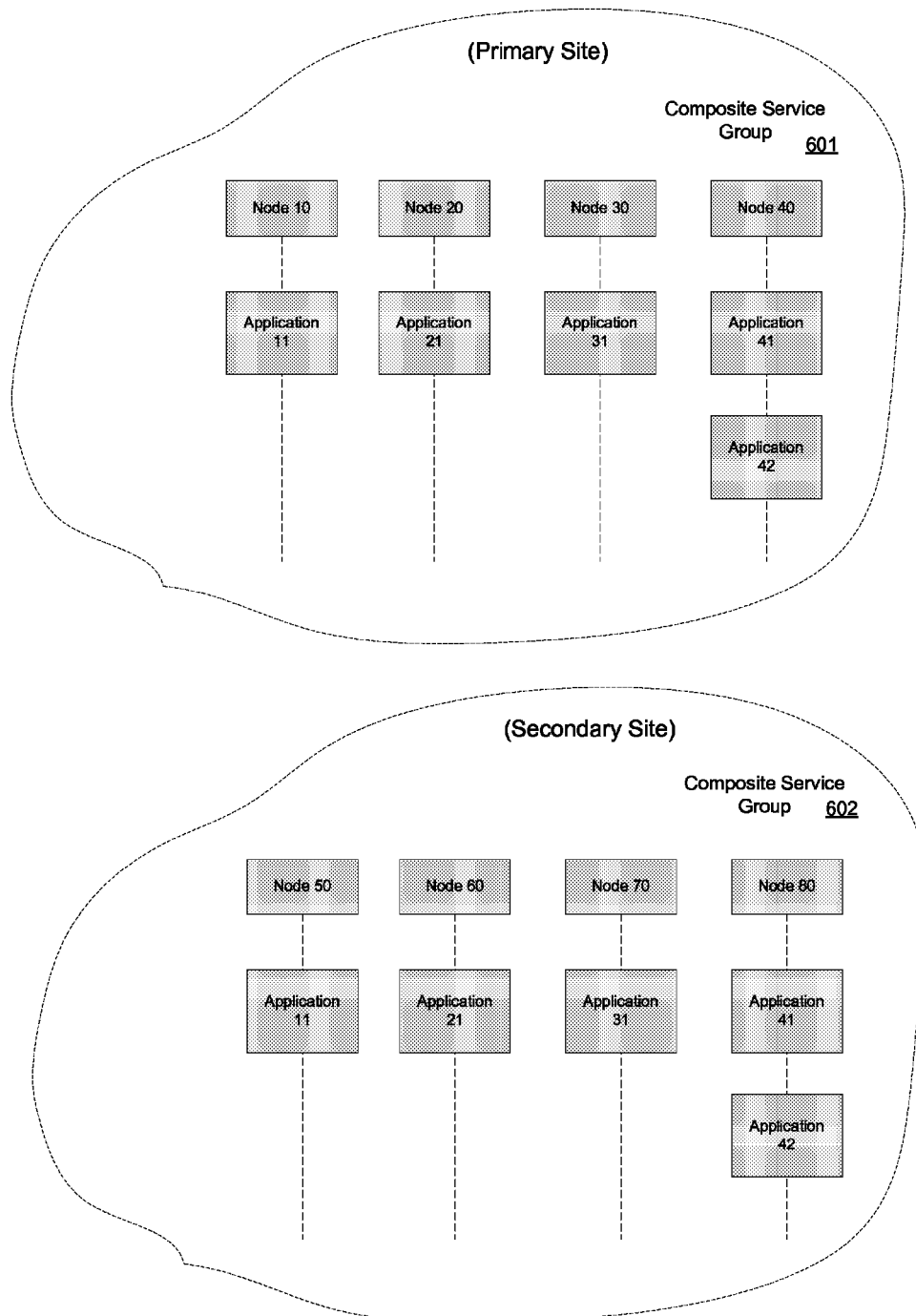
FIG. 6 shows a primary site and a secondary site where the CSG has been fully replicated for HA/DR in accordance with one embodiment of the present invention.

Referring now to FIG. 6, FIG. 6 shows a primary site 601 and a secondary site 602 where the CSG has been replicated for HA/DR in accordance with one embodiment of the present invention. As depicted in FIG. 6, the primary site includes nodes 10-40, each running applications as shown. Replication technology is used to replicate data and OS images to the secondary site 602 on the nodes 50-80 as shown. As described above, the primary site and secondary site can be implemented at geographically separated locations to provide an exceptionally high degree of HA/DR protection. Their widely separated locations provide disaster recovery protection from large scale events that can affect services and disrupt infrastructure across large areas (e.g., hurricanes, earthquakes, tsunamis, etc.).

Figure 7:
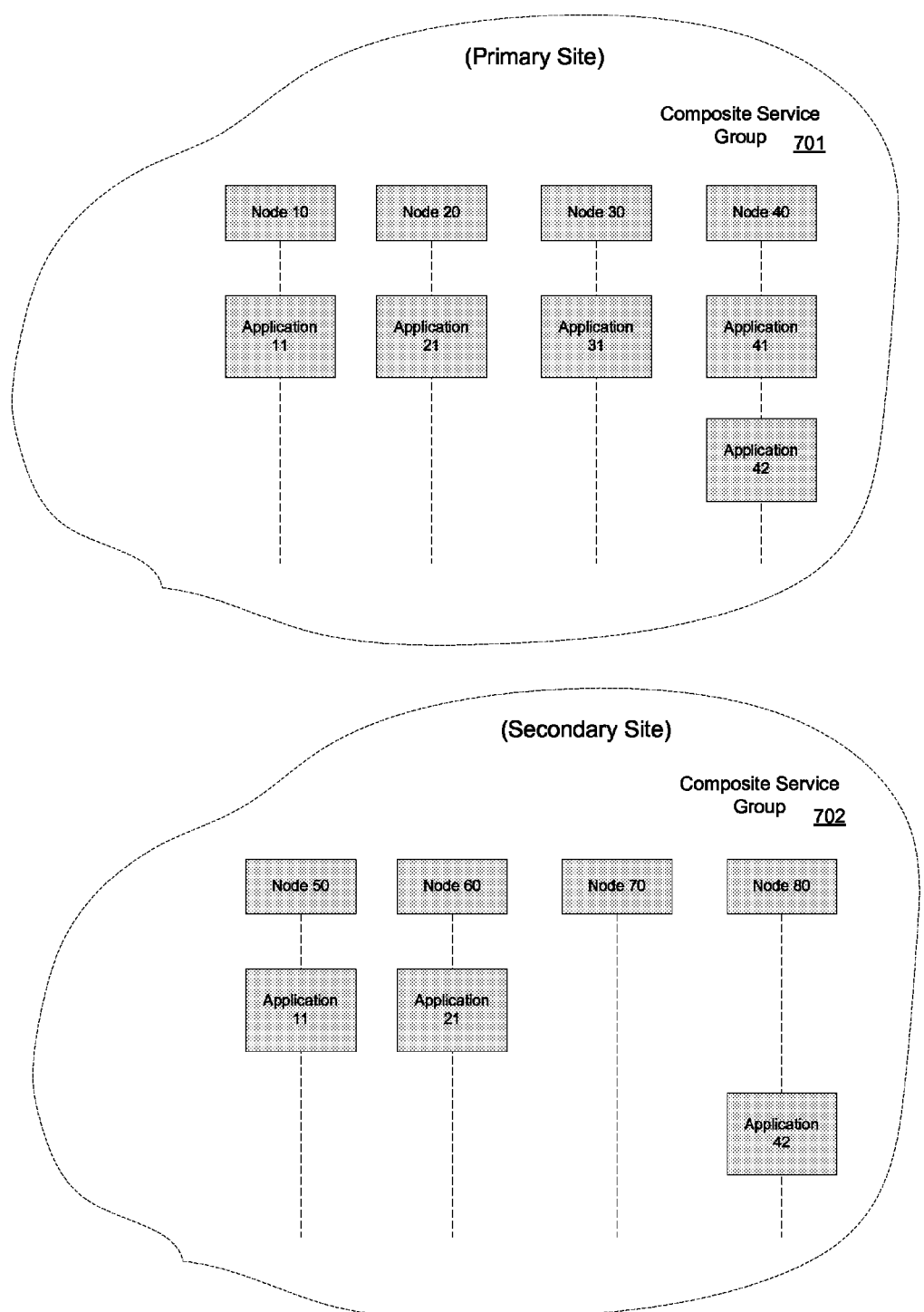
FIG. 7 shows a primary site and a secondary site where the CSG has been partially replicated for HA/DR in accordance with one embodiment of the present invention.

FIG. 7 shows a primary site 701 and a secondary site 702 where the CSG has been partially replicated for HA/DR in accordance with one embodiment of the present invention. As depicted in FIG. 7, the primary site includes nodes 10-40, each running applications as shown. However, the applications from the composite service group 701 have not been fully replicated to the composite service group 702. In this case, the partial replication provides the option of maintaining certain core functionality of the composite service group 701 in case of failover to the composite service group 702.

There may be a number of different circumstances which make it advantageous to only failover core functionality as opposed to complete functionality. There may exist scenarios where a relatively small number of application units can provide a large majority of the functionality of a given business service. In such cases, it may be cost effective to only provision for failing over the core functionality provided by the small number of application units. This aspect can reduce the amount of time it takes to replicate between the primary site and the secondary site. This aspect can increase the frequency of replication between the primary site and secondary site. Additionally, only providing core functionally failover can reduce costs (e.g., the hardware and software resources) associated with the secondary site and bandwidth between the primary site and the secondary site.

Figure 8:
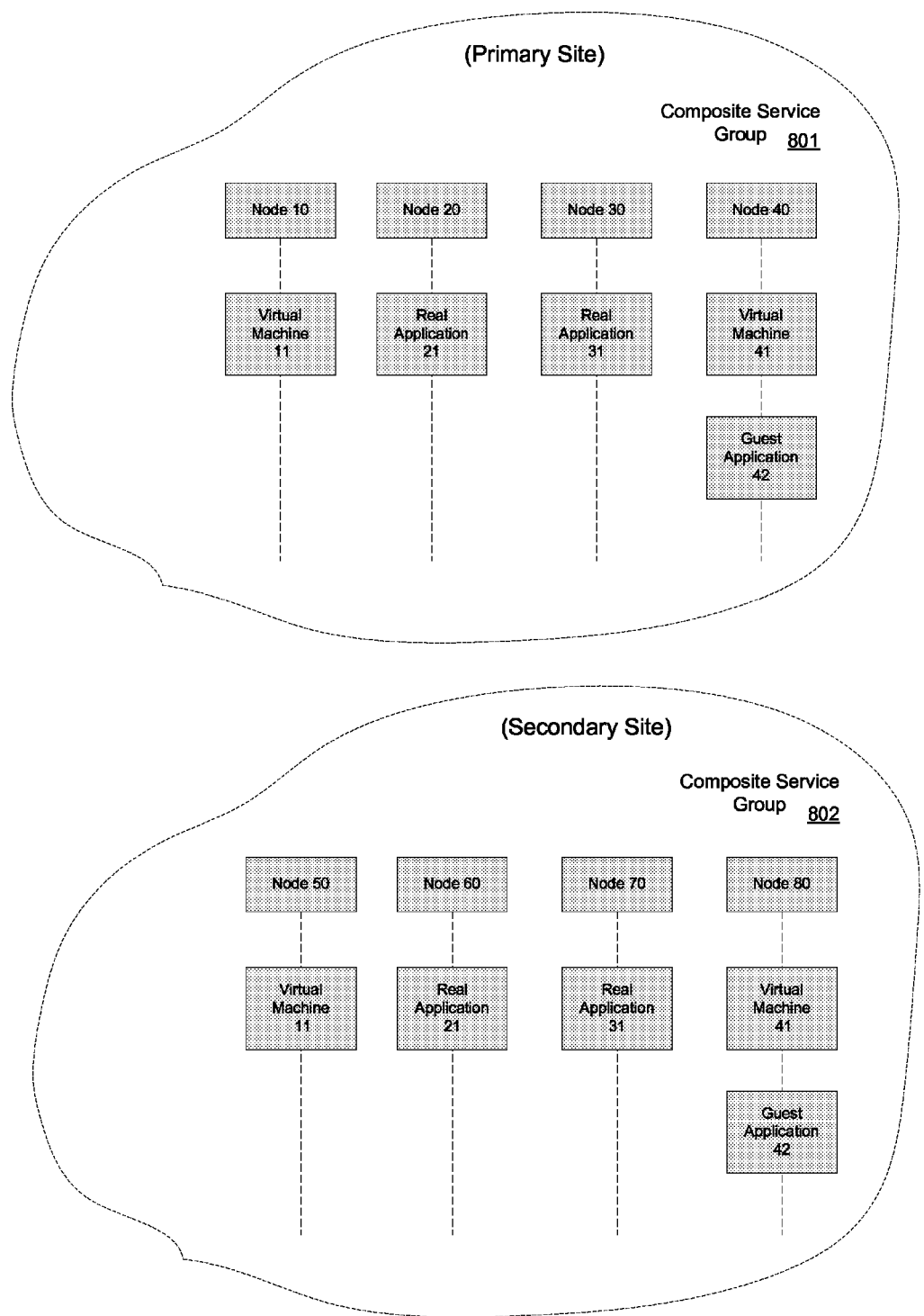
FIG. 8 shows a primary site and a secondary site where a CSG including both virtual machines and real applications has been fully replicated for HA/DR in accordance with one embodiment of the present invention.

FIG. 8 shows a primary site 801 and a secondary site 802 where a CSG including both virtual machines and real applications has been fully replicated for HA/DR in accordance with one embodiment of the present invention. As depicted in FIG. 8, the primary site includes nodes 10-40, each running virtual machines, real applications, and guest applications as shown. In the FIG. 8 embodiment, replication technology is used to fully duplicate the virtual machines, real applications, and guest applications on the secondary site 802 on the nodes 50-80 as shown.

As described above, an application unit is an encompassing term that refers to a range of different processes or applications that implement the different components of functionality that make up an overall business service. The application unit can be an application executing on a physical machine (e.g., a database application, Web server, etc.). The application unit can be a guest instance on a virtual machine, or the entire virtual machine executing on a physical machine. The application unit can be on different platforms (e.g., MIPS, x86, Itanium, etc.). The application unit can be on different operating systems (e.g., Linux, Solaris, Windows, etc.). Thus, FIG. 8 visually depicts the different kinds of application units that can be gathered in a CSG in accordance with embodiments of the present invention.

Figure 9:
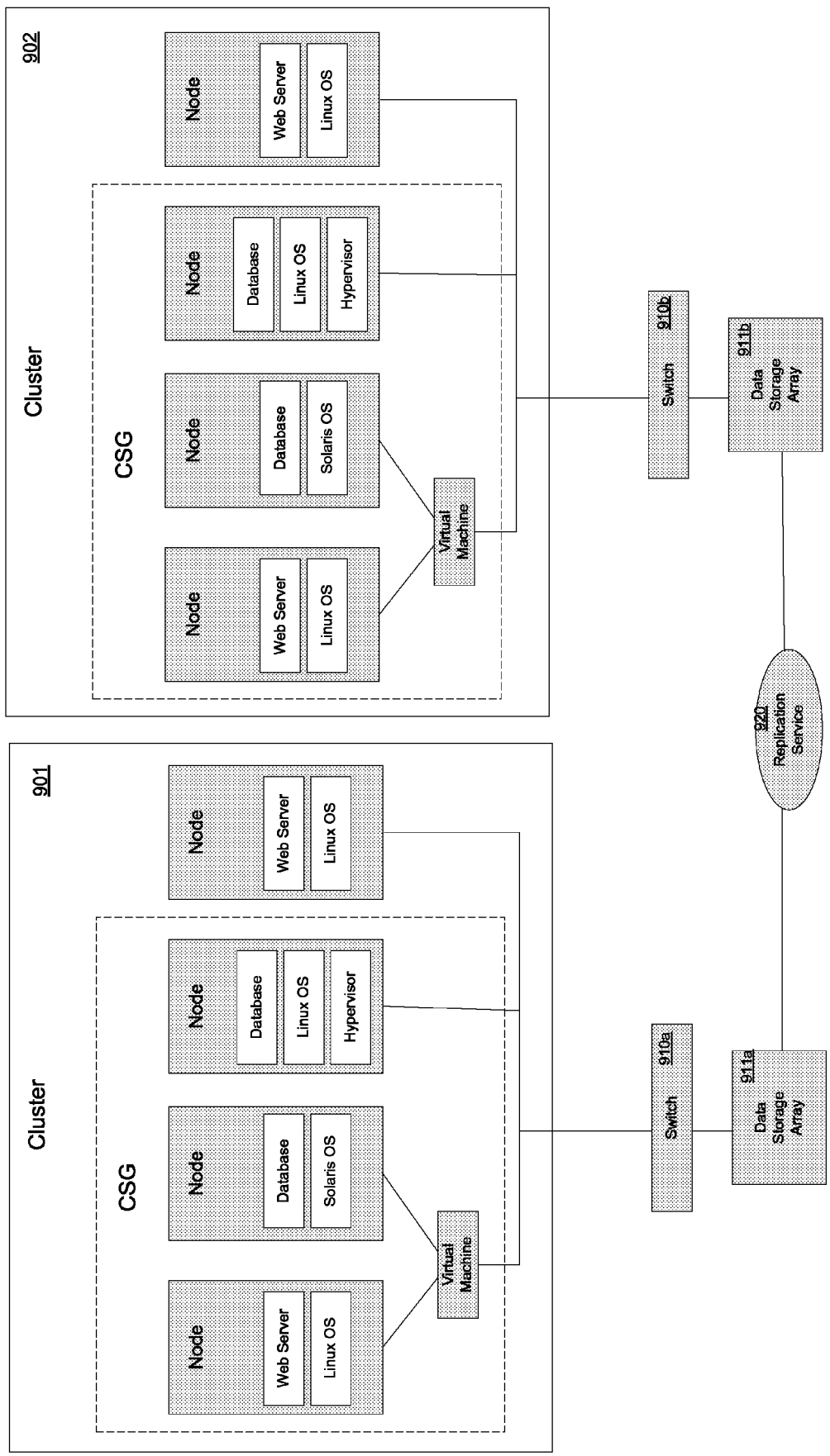
FIG. 9 shows a first cluster and a second cluster where a CSG including both virtual machines and real applications has been fully replicated for HA/DR in accordance with one embodiment of the present invention.

FIG. 9 shows a first cluster 901 and a second cluster 902 where a CSG including both virtual machines and real applications has been fully replicated for HA/DR in accordance with one embodiment of the present invention. As described above, an application unit can be instantiated on different platforms (e.g., MIPS, x86, Itanium, etc.). The application unit can be a guest instance on a virtual machine, or the entire virtual machine executing on a physical machine.

The clusters 901-902 can both be located at the primary site. For example, as described above, the cluster 901 can be at one building on a campus while the cluster 902 is in another building on the campus. Alternatively, the clusters 901-902 can be located at a geographically dispersed primary site and secondary site. As described above, the physical separation at widely geographically separated locations provides an exceptionally high degree of HA/DR protection.

FIG. 9 visually depicts a switch 910a-910b that provides communications connectivity for each cluster as shown. The switches 910 provides connections to data storage arrays 911a-911b as shown (e.g., storage area networks, etc.). A replication service 920 provides the periodic replication functionality for the data redundancy between the clusters 901-902. Thus FIG. 9 visually depicts the different kinds of application units that can be gathered in a CSG along with the data storage and replication service in accordance with one embodiment of the present invention.

FIG. 10 shows a flowchart of the steps of a process 1000 for executing a business service on a cluster based computer system while providing HA/DR via a CSG in accordance with one embodiment of the present invention. As depicted in FIG. 10, process 1000 shows the operating steps in initializing a CSG, setting up periodic replication, and managing a business service.

Process 1000 begins in step 1001, where a plurality of application units of a business service is instantiated on a cluster computer system. As described above, an application unit is an encompassing term that refers to a range of different processes or applications that implement the different components of functionality that make up an overall business service. The application unit can be an application executing on a physical machine (e.g., a database application, Web server, etc.). The application unit can be a virtual machine application unit, such as a guest instance on a virtual machine, or the entire virtual machine executing on a physical machine.

In step 1002, a CSG definition is received (e.g., from a system administrator) that includes the application units that comprise the business service. As described above, in one embodiment, the CSG comprises an enumerated list that uniquely describes which application units make up a given business service. The unique name of the CSG enables the easy and recognizable manipulation and/or administration of the CSG by other processes or by a system administrator. The enumerated list describes the hierarchical interrelationships that exist between the application units that make up the business service. The enumerated list describes any sequential dependencies that may exist.

In step 1003, a consolidated status of the CSG is generated. As described above, the consolidated status can visually indicate certain states indicating the current availability of the application. In one embodiment, flags and/or visual indicators can indicate whether a CSG is offline, partial or online. The consolidated status can be visually indicated by a GUI that can visually indicate an individual status of each of the application units comprising the CSG.

In step 1004, the CSG is used to set up a replication process between the primary site and a secondary site for HA/DR. As described above, the CSG comprises a unit of failover. Each of the application units comprising the CSG are replicated and/or failed over together as a whole.

Subsequently, in step 1005, the CSG is used to manage the business service and bring the business service online via a CSG command. As described above, managing a CSG involves being able to start a CSG, stop a CSG, switch a CSG between different sites, and the like. This management is via reference to the CSG name. The management is implemented typically by a system administrator via either a command line interface or a GUI.

Figure 11:
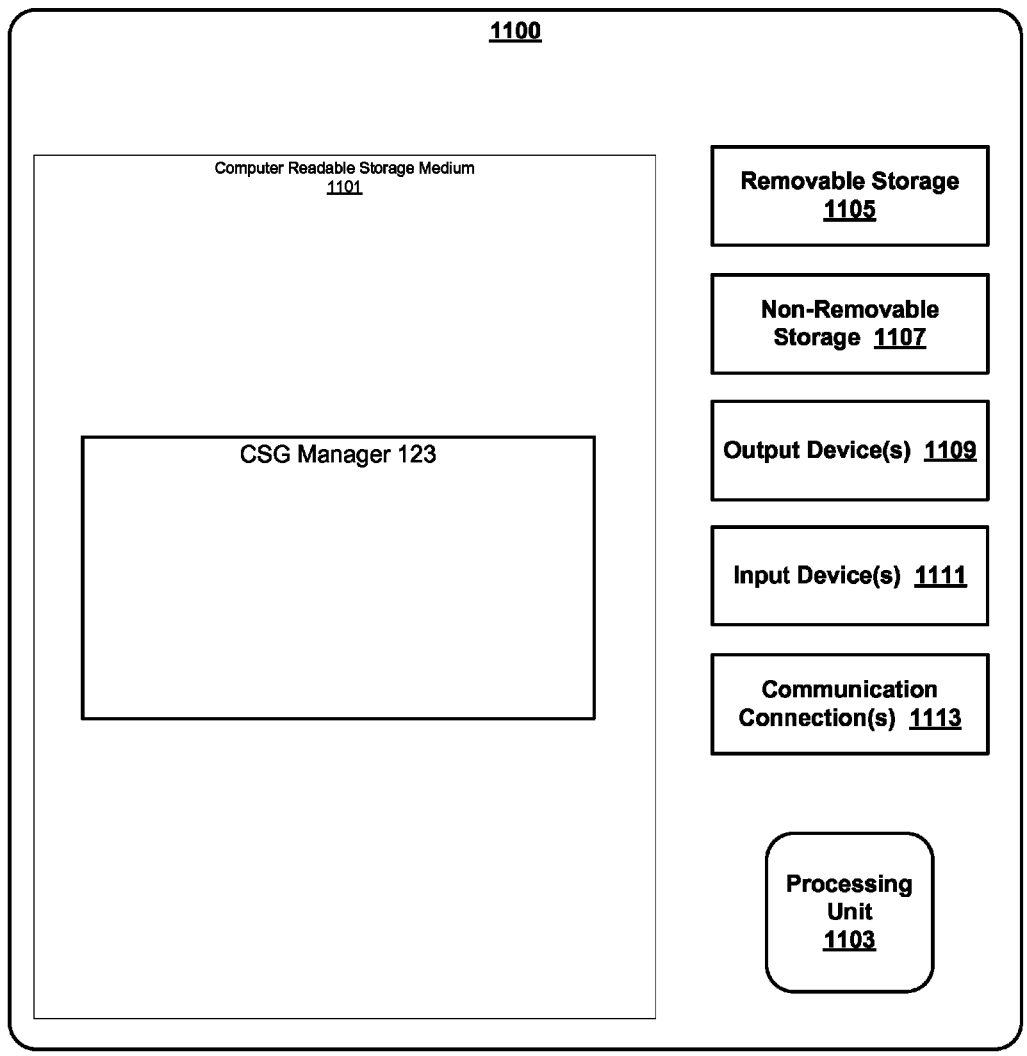
FIG. 11 shows an exemplary computer system according to one embodiment.

FIG. 11 shows an exemplary computer system 1100 according to one embodiment. Computer system 1100 depicts the components of a basic computer system providing the execution environment for certain hardware-based and software-based functionality for the above described embodiments. For example, computer system 1100 can be a system upon which the CSG manager 123 is instantiated (e.g., from FIG. 1). Computer system 1100 can be implemented as, for example, a server computer system, workstation computer system, desktop computer system, or laptop computer system. Similarly, computer system 1100 can be implemented as a handheld device. Computer system 1100 typically includes at least some form of computer readable media (e.g., computer readable storage medium 1101). Computer readable media can be a number of different types of available media that can be accessed by computer system 1100 and can include, but is not limited to, computer storage media.

In its most basic configuration, computer system 1100 typically includes processing unit 1103 and a computer readable storage medium 1101. Depending on the exact configuration and type of computer system 1100 that is used, memory 1101 can be volatile (e.g., such as DRAM, etc.), non-volatile (e.g., such as ROM, flash memory, etc.) or some combination of the two. Similarly, the memory 1101 can comprise other devices besides solid-state devices, such as, for example, magnetic disk-based media, optical media, or the like.

Additionally, computer system 1100 can include other mass storage systems (e.g., removable 1105 and/or non-removable 1107) such as magnetic or optical disks or tape. Similarly, computer system 1100 can include input devices 1111 and/or output devices 1109 (e.g., such as a display). Computer system 1100 can further include communication connections 1113 to other devices, computers, networks, servers, etc. using either wired or wireless media. As all of these devices are well known in the art, they need not be discussed in detail.

It should further be noted, that the computer system 1100 can have some, most, or all of its functionality supplanted by a distributed computer system having a large number of dispersed computing nodes, such as would be the case where the functionality of the computer system 1100 is partly or wholly executed using a cloud computing environment.

Figure 12:
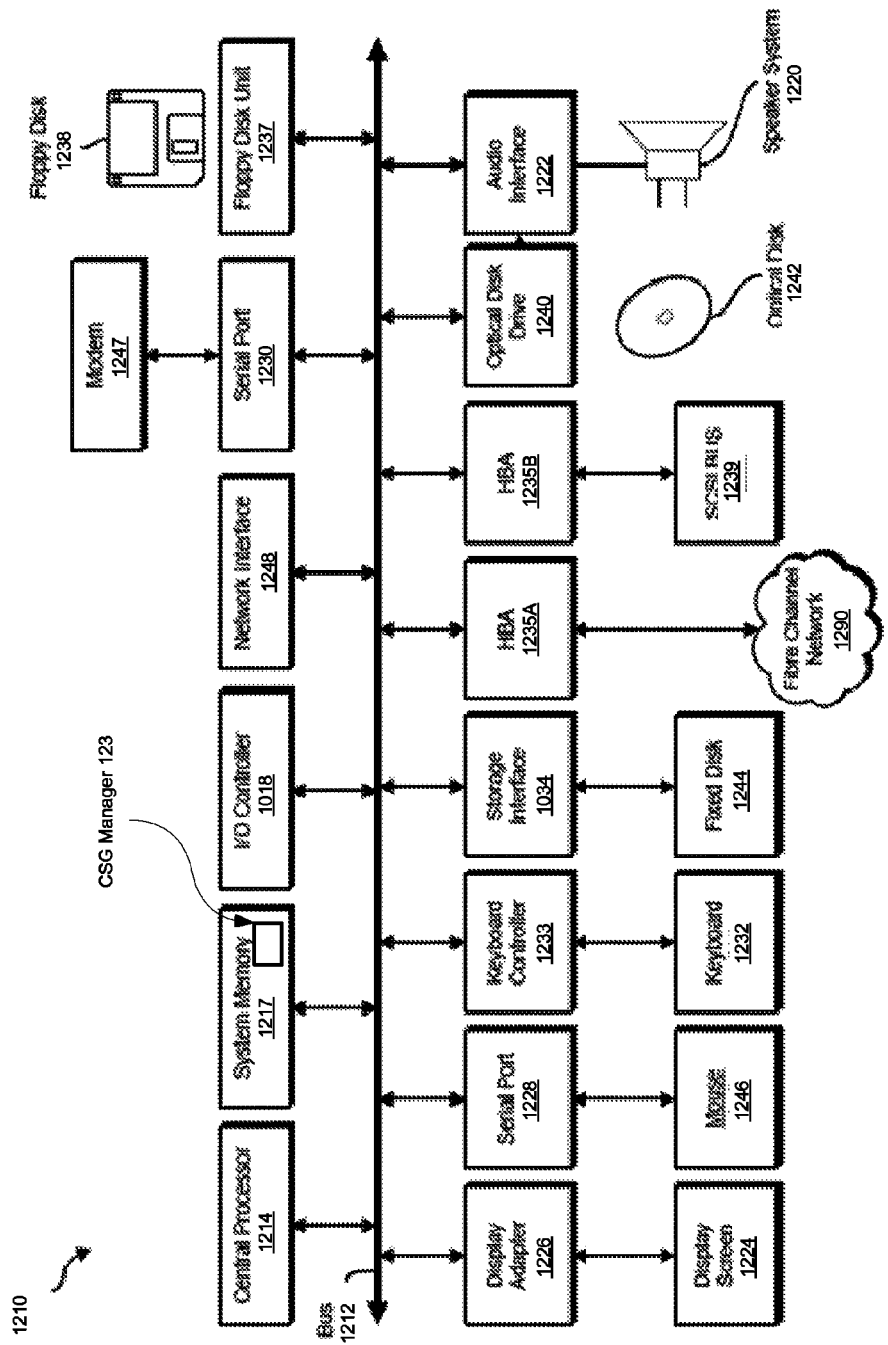
FIG. 12 depicts a block diagram of a computer system suitable for implementing certain functionality in accordance with one embodiment of the present invention.

FIG. 12 depicts a block diagram of a computer system 1210 suitable for implementing certain functionality in accordance with one embodiment of the present invention. Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, serial ports 1228 and 1230, a keyboard 1232 (interfaced with a keyboard controller 1233), a storage interface 1234, a floppy disk drive 1237 operative to receive a floppy disk 1238, a host bus adapter (HBA) interface card 1235A operative to connect with a Fiber Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. The RAM is generally the main memory into which the operating system and application programs are loaded. In the FIG. 12 embodiment, the system memory 1217 instantiates a CSG manager module 123 which implements the CSG HA/DR functionality described above. The ROM or flash memory can contain, among other code, the Basic Input-Output system (BIOS) which controls basic hardware operation such as the interaction with peripheral components. Applications resident with computer system 1210 are generally stored on and accessed via a computer readable medium, such as a hard disk drive (e.g., fixed disk 1244), an optical drive (e.g., optical drive 1240), a floppy disk unit 1237, or other storage medium. Additionally, applications can be in the form of electronic signals modulated in accordance with the application and data communication technology when accessed via network modem 1247 or interface 1248.

Storage interface 1234, as with the other storage interfaces of computer system 1210, can connect to a standard computer readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present disclosure. The devices and subsystems can be interconnected in different ways from that shown in FIG. 12. The operation of a computer system such as that shown in FIG. 12 is readily known in the art and is not discussed in detail in this application. Code to implement the present disclosure can be stored in computer-readable storage media such as one or more of system memory 1217, fixed disk 1244, optical disk 1242, or floppy disk 1238. The operating system provided on computer system 1210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for defining and managing a composite service group for a cluster based computer system, comprising:

instantiating a plurality of application units on a cluster based computer system, wherein the application units implement a business service;

receiving a composite service group definition, wherein a composite service group enumerates application units, out of the plurality of application units, that implement the business service, and wherein the composite service group represents a container object in the cluster based computer system, wherein the composite service group includes hierarchical dependency information for controlling initialization for each of the application units that implement the business service, and sequential dependency information for controlling initialization for each of the application units that implement the business service;

generating a consolidated status of the composite service group; and bringing the business service online or offline in accordance with the consolidated status by using the composite service group.

2. The method of claim 1, wherein the composite service group defines a boundary controlling communication between the applications that implement the business service and other applications units out of the plurality of application units.

3. The method of claim 1, wherein the composite service group encapsulates dependencies, constraints, or system placement strategies for the application units that implement the business service.

4. The method of claim 1, wherein the consolidated status visually indicates an individual status for each of the application units that implement the business service.

5. The method of claim 1, wherein the composite service group comprises a unit of failover between a first cluster and a second cluster, wherein the application units of the composite service group are failed over from the first cluster to the second cluster as a whole.

6. The method of claim 1, wherein the composite service group is used to set up a replication process between a primary site and a secondary site for high availability or disaster recovery.

7. The method of claim 1, wherein the composite service group is used to provide administrative control of the application units that implement the business service via a command line interface or a graphical user interface.

8. The method of claim 1, wherein at least one of the application units that implement the business service is a virtual machine application unit.

9. A non-transitory computer readable storage medium having stored thereon, computer executable instructions that, when executed by a computer system cause the computer system to perform a method comprising:

instantiating a plurality of application units on a cluster based computer system, wherein the application units implement a business service;

receiving a composite service group definition, wherein a composite service group enumerates application units, out of the plurality of application units, that implement the business service, and wherein the composite service group represents a container object in the cluster based computer system, wherein the composite service group includes hierarchical dependency information for controlling initialization for each of the application units that implement the business service, and sequential dependency information for controlling initialization for each of the application units that implement the business service;

generating a consolidated status of the composite service group; and bringing the business service online in accordance with the consolidated status by using the composite service group, wherein the composite service group is used to provide administrative control of the application units that implement the business service.

10. The computer readable storage medium of claim 9, wherein the composite service group encapsulates dependencies, constraints, or system placement strategies for the application units that implement the business service.

11. The computer readable storage medium of claim 9, wherein the consolidated status visually indicates an individual status for each of the application units that implement the business service.

12. The computer readable storage medium of claim 9, wherein the composite service group comprises a unit of failover between a first cluster and a second cluster, wherein the application units of the composite service group are failed over from the first cluster to the second cluster as a whole.

13. The computer readable storage medium of claim 9 wherein the composite service group is used to set up a replication process between a primary site and a secondary site for disaster recovery.

14. A computer system, comprising:

a computer system having a processor coupled to a computer readable storage media and executing computer readable code which causes the computer system to:

execute a composite service group manager module;

receive a composite service group definition, wherein a composite service group enumerates application units, out of a plurality of application units, that implement a business service, wherein the plurality of application units are instantiated on a cluster based computer system, and wherein the composite service group represents a container object in the cluster based computer system, wherein the composite service group includes hierarchical dependency information for controlling initialization for each of the application units that implement the business service, and sequential dependency information for controlling initialization for each of the application units that implement the business service;

generate a consolidated status of the composite service group;

set up a replication process between a primary site and a secondary site by using the composite service group; and bring the business service online in accordance with the consolidated status.

15. The computer system of claim 14, wherein the composite service group encapsulates dependencies, constraints, or system placement strategies for the application units that implement the business service.

16. The method of claim 14, wherein the composite service group comprises a unit of failover between a first cluster and a second cluster, wherein the application units of the composite service group are failed over from the first cluster to the second cluster as a whole.

* * * * *